US011923163B2

(12) United States Patent
Hochmuth et al.

(10) Patent No.: US 11,923,163 B2
(45) Date of Patent: Mar. 5, 2024

(54) FUSE ELEMENT AND FUSE

(71) Applicant: Siemens Aktiengesellschaft, Munich (DE)

(72) Inventors: Thomas Hochmuth, Nittenau (DE); Robert Huettinger, Schoefweg (DE); Jean-Mary Martel, Tegernheim (DE); Christian Rohrwild, Regensburg (DE); Adolf Schmid, Laaber (DE); Volker Seefeld, Burglengenfeld (DE)

(73) Assignee: Siemens Aktiengesellschaft, Munich (DE)

( * ) Notice: Subject to any disclaimer, the term of this patent is extended or adjusted under 35 U.S.C. 154(b) by 95 days.

(21) Appl. No.: 17/419,802

(22) PCT Filed: Dec. 3, 2019

(86) PCT No.: PCT/EP2019/083414
§ 371 (c)(1),
(2) Date: Jun. 30, 2021

(87) PCT Pub. No.: WO2020/148015
PCT Pub. Date: Jul. 23, 2020

(65) Prior Publication Data

US 2022/0068582 A1 Mar. 3, 2022

(30) Foreign Application Priority Data

Jan. 16, 2019 (DE) ..................... 10 2019 200 460.1

(51) Int. Cl.
*H01H 85/175* (2006.01)
*H01H 85/06* (2006.01)
(Continued)

(52) U.S. Cl.
CPC ............ *H01H 85/30* (2013.01); *H01H 85/06* (2013.01); *H01H 85/175* (2013.01); *H01H 2085/0266* (2013.01); *H01H 2085/0291* (2013.01)

(58) Field of Classification Search
CPC .... H01H 85/055; H01H 85/06; H01H 85/165; H01H 85/175; H01H 85/1755;
(Continued)

(56) References Cited

U.S. PATENT DOCUMENTS 6,778,389 B1 8/2004 Glovatsky et al.
10,784,065 B2 9/2020 Signer et al.
(Continued)

FOREIGN PATENT DOCUMENTS

CN 101151943 A 3/2008
CN 101461113 A 6/2009
(Continued)

OTHER PUBLICATIONS

PCT International Search Report and Written Opinion of International Searching Authority dated Feb. 21, 2020 corresponding to PCT International Application No. PCT/EP2019/083414 filed Dec. 3, 2019.

(Continued)

*Primary Examiner* — Jacob R Crum
(74) *Attorney, Agent, or Firm* — Harness, Dickey & Pierce, P.L.C.

(57) ABSTRACT

A fuse element for a fuse with an integrated measurement function, includes a first receiving area in an embodiment, for receiving a melting conductor of the fuse, delimited in the length direction of the fuse by a closure element and in a direction orthogonal to the length direction by the fuse element. Further, in an embodiment, the fuse element has a second receiving area, physically separated from the first
(Continued)

receiving area, for receiving a measuring device of the fuse. The second receiving area is designed to receive the measuring device in a wall section of the fuse element. The second receiving area formed in the fuse element protects the measuring device arranged therein against interfering environmental influences. The measuring device is used to ascertain the electric current flowing through the fuse directly on the fuse.

12 Claims, 3 Drawing Sheets

(51) Int. Cl.
*H01H 85/30* (2006.01)
*H01H 85/02* (2006.01)

(58) Field of Classification Search
CPC ........... H01H 85/30; H01H 2085/0266; H01H 2085/0275; H01H 2085/0291
See application file for complete search history.

(56) References Cited

U.S. PATENT DOCUMENTS

| | | | | |
|---|---|---|---|---|
| 2002/0181221 | A1 | 12/2002 | Ries et al. | |
| 2004/0264092 | A1* | 12/2004 | Grunbichler | H01C 7/126 361/103 |
| 2005/0231320 | A1* | 10/2005 | Ackermann | H01H 85/30 337/206 |
| 2008/0042796 | A1 | 2/2008 | Moffat | |
| 2008/0093110 | A1 | 4/2008 | Bagung | |
| 2009/0108980 | A1 | 4/2009 | Whitney et al. | |
| 2009/0237198 | A1* | 9/2009 | Yang | H01H 85/0417 337/266 |
| 2012/0242449 | A1 | 9/2012 | Faltermeier et al. | |
| 2013/0335188 | A1* | 12/2013 | Faltermeier | H01H 85/20 337/283 |
| 2015/0285841 | A1* | 10/2015 | Doljack | G01R 15/207 324/127 |
| 2015/0294826 | A1 | 10/2015 | Kim et al. | |
| 2015/0301111 | A1 | 10/2015 | Bruchmann | |
| 2016/0013631 | A1* | 1/2016 | Ehrler | H02H 9/04 361/91.1 |
| 2016/0035529 | A1* | 2/2016 | Durth | H01H 85/143 337/18 |
| 2016/0064173 | A1 | 3/2016 | Bukacek et al. | |
| 2018/0331571 | A1 | 11/2018 | Smit | |
| 2022/0059307 | A1 | 2/2022 | Huettinger et al. | |
| 2022/0093356 | A1 | 3/2022 | Huettinger et al. | |

FOREIGN PATENT DOCUMENTS

| | | | |
|---|---|---|---|
| CN | 101483117 | A | 7/2009 |
| CN | 102779701 | A | 11/2012 |
| CN | 203747397 | U | 7/2014 |
| CN | 106688074 | A | 5/2017 |
| CN | 2017097771 | U | 3/2018 |
| CN | 108475601 | A | 8/2018 |
| DE | 3411323 | A1 | 10/1985 |
| DE | 19523725 | C2 | 6/1997 |
| DE | 19836815 | A1 | 2/2000 |
| DE | 10224007 | A1 | 12/2002 |
| DE | 102004033401 | A1 | 2/2005 |
| DE | 10 2005 012 404 | | 9/2006 |
| DE | 102011005884 | A1 | 9/2012 |
| DE | 102012210292 | A1 | 12/2013 |
| DE | 102014205871 | A1 | 10/2015 |
| DE | 102016211621 | A1 | 12/2017 |
| EP | 0917723 | B1 | 3/2000 |
| EP | 1116252 | B1 | 7/2002 |
| EP | 1513180 | A1 | 3/2005 |
| EP | 1560245 | A1 | 8/2005 |
| EP | 2423693 | A1 | 2/2012 |
| EP | 2885800 | A1 | 6/2015 |
| EP | 2985779 | A1 | 2/2016 |
| EP | 3026445 | B1 | 8/2017 |
| FR | 715818 | A | 12/1931 |
| JP | H11273544 | A | 10/1999 |
| JP | 2018163052 | A | 10/2018 |
| KR | 101389709 | B1 | 4/2014 |
| KR | 101747792 | B1 | 6/2017 |
| WO | WO 2014026702 | A1 | 2/2014 |
| WO | WO 2017078525 | A1 | 5/2017 |

OTHER PUBLICATIONS

German Search Report for German Patent Application No. 102019200460.1 dated Oct. 25, 2019.
U.S. Appl. No. 17/414,412, filed Jun. 16, 2021.

* cited by examiner

FUSE ELEMENT AND FUSE

PRIORITY STATEMENT

This application is the national phase under 35 U.S.C. § 371 of PCT International Application No. PCT/EP2019/083414 which has an International filing date of Dec. 3, 2019, which claims priority to German application number 102019200460.1 filed Jan. 16, 2019, the entire contents of each of which are hereby incorporated herein by reference.

FIELD

The disclosure generally relates to a fuse body for a fuse with an integrated measurement function, having a first reception space for receiving a fuse element of the fuse, and having a second reception space for receiving a measurement device of the fuse. The disclosure further generally relates to a fuse with an integrated measurement function and which has such a fuse body.

BACKGROUND

Conductors that are flowed through by an electric current heat up. In the case of impermissibly high currents, this may result in an impermissibly great heating of the conductor and, as a result, in melting of the insulation surrounding the conductor, which may thus lead to damage up to a cable fire. To prevent this fire risk, in the event of an occurrence of an excessively high electric current, that is to say of an overload current or of a short-circuit current, this electric current has to be promptly disconnected. This is ensured using what are known as overcurrent protection apparatuses.

One example of such an overcurrent protection apparatus is, for example, a fuse that interrupts the circuit through the melting of one or more fuse elements when the current strength of the circuit secured by the fuse exceeds a particular value for more than a particular time. The fuse includes an insulating body, which has two electrical terminals that are electrically conductively connected to one another by one or more fuse elements inside the insulating body. The fuse element, which has a reduced cross section in comparison with the rest of the conductors in the circuit, is heated by the current flowing through it and melts when the critical nominal current of the fuse is significantly exceeded for a predetermined time. Ceramic is mostly used as the material for the insulating body due to its good insulation properties. The use of a fuse in this manner is already known in principle for example from European patent document EP 0 917 723 B1 or from German laid-open documents DE 10 2014 205 871 A1 and DE 10 2016 211 621 A1.

Fuses are able to be obtained in various structural types. In addition to simple device fuses, which have a simple glass cylinder in which the fuse element is received, there are also structures in which the ceramic body is filled with sand—mainly quartz sand: in this case, a distinction is drawn between types having solidified and having unsolidified quartz sand. In the case of a fuse solidified with sand, the fuse element is surrounded by quartz sand. The housing of the fuse is generally in this case formed by a ceramic body in which the solidified sand, the electrical terminals and the fuse element are received or held. The quartz sand in this case functions as a light arc-extinguishing means: if the nominal current of the fuse is significantly exceeded—for example due to a high short-circuit current—then this leads to the fuse being stressed, during which stress the fuse element first of all melts and then evaporates due to the high temperature development. This gives rise to an electrically conductive plasma by way of which the current flow between the electrical terminals is first of all maintained—a light arc forms. Since the metal vapor of the evaporated fuse element precipitates on the surface of the grains of quartz sand, the light arc is in turn cooled. As a result, the resistance inside the fuse insert increases such that the light arc is ultimately extinguished. The electrical line to be protected by the fuse is thus interrupted.

Low-voltage high-power fuses, what are known as NH fuses, but also semiconductor protective fuses, what are known as HLS fuses, as are marketed for example under the product name SITOR, are already known in principle from the prior art in the field of fuses. In the case of NH fuses, one or more fuse elements in the form of metal strips are normally used. In this case, the fuse elements mostly have what are known as rows of narrow points in order to selectively disconnect the fuse. Furthermore, at least one solder deposit may be applied to one or more of the fuse elements, by way of which solder deposit the overload characteristic of the fuse is able to be influenced. The critical permitted power value I2t for the disconnection behavior of the fuse is relatively high in the case of NH fuses, as a result of which these have a somewhat more lethargic characteristic.

If the fuse element is heated by an electric overload current to a temperature that lies above the melting temperature of the solder, then this solder diffuses into the fuse element material and forms an alloy therewith. The electrical resistance of the fuse element thereby increases, which leads to further heating thereof, as a result of which the diffusion procedure is accelerated further until the fuse element has completely dissolved into the surroundings of the solder deposit, such that it breaks off, as a result of which the current flow is interrupted. In the case of a brief, permissible overcurrent, no early disconnection takes place by virtue of the NH fuse. If a short-circuit current occurs, by contrast, the fuse element tears off at the rows of narrow points. As a result, a plurality of small series-connected light arcs arise at the same time whose voltages add up and thus lead to quicker disconnection of the fuse. NH fuses serve, for example, to protect installations or switching cabinets from fire, for example caused by overheated connecting lines.

On the part of the operators of electrical installations, there is an increasing desire to be able to determine the state of an electrical installation in a timely fashion. In the past, this was often carried out by way of a visual check—in the case of fuses, for example, in that the fuses are equipped with an indicator that optically signals tripping of the respective fuse externally on the housing of the fuse in question. For the future, however, it is increasingly required to be able to query this information at any time and as far as possible in a manner independent of location, for example from a control station. For this reason, electrical installation devices are increasingly being supplemented so as to provide information about their operating state. Electrical switching devices, for example, fire protection switches, which already have dedicated control logic, are able to be supplemented with relatively little expenditure so as to prepare and provide corresponding information.

In the case of fuses, there are corresponding solutions involving recording and forwarding the "triggered" information, provided optically by the indicator, by way of a communication module able to be attached to the fuse. Attachable solutions, however, have the disadvantage that they require additional installation space and are therefore able to be used only with relatively high expenditure in pre-existing installations. For a simple retrofit use, in which an existing fuse of a conventional design without a communication module, that is to say without a measurement, evaluation and communication unit, is replaced with a new fuse with a corresponding communication module within the meaning of retrofitting or modernization of the installation, these attachable solutions are often not used as the additional installation space required therefor is not available.

To solve this problem of limited installation space, which occurs especially in the case of retrofit applications, international patent application WO 2017/078525 A1 describes a fuse in which a current sensor is integrated into the pressure body of the fuse. By way of this current sensor, the current flow through the fuse occurring during normal operation is able to be measured and transmitted to a querying unit arranged outside the fuse. Since comparatively high temperatures may also, however, occur in a fuse, it is questionable as to how reliably a sensor integrated into the pressure body of the fuse functions over the service life of the fuse.

SUMMARY

At least one embodiment of the present disclosure provides a fuse with an integrated measurement function and a fuse body for such a fuse that at least partly overcome at least one of the abovementioned problems.

Embodiments according to the invention are directed to a fuse with an integrated measurement function and a fuse body for such a fuse. Advantageous configurations of the fuse according to embodiments of the invention and of the fuse body according to embodiments of the invention are the subject matter of the claims.

The fuse body according to an embodiment of the invention for a fuse with an integrated measurement function has a first reception space for receiving a fuse element of the fuse, wherein the first reception space is limited in a direction of longitudinal extent of the fuse by way of a closure element and in a direction orthogonal to the direction of longitudinal extent by way of the fuse body. The fuse body furthermore has a second reception space physically delimited from the first reception space for receiving a measurement device of the fuse, wherein the second reception space is designed to receive the measurement device in a wall section of the fuse body.

BRIEF DESCRIPTION OF THE DRAWINGS

An example embodiment of the fuse body according to the invention and the fuse according to the invention is explained in more detail in the following text with reference to the appended figures. In the figures.

In the various figures of the drawing, identical parts are always provided with the same reference signs. The description applies to all of the drawing figures in which the corresponding part is likewise able to be seen.

DETAILED DESCRIPTION OF THE EXAMPLE EMBODIMENTS

Figure 1:
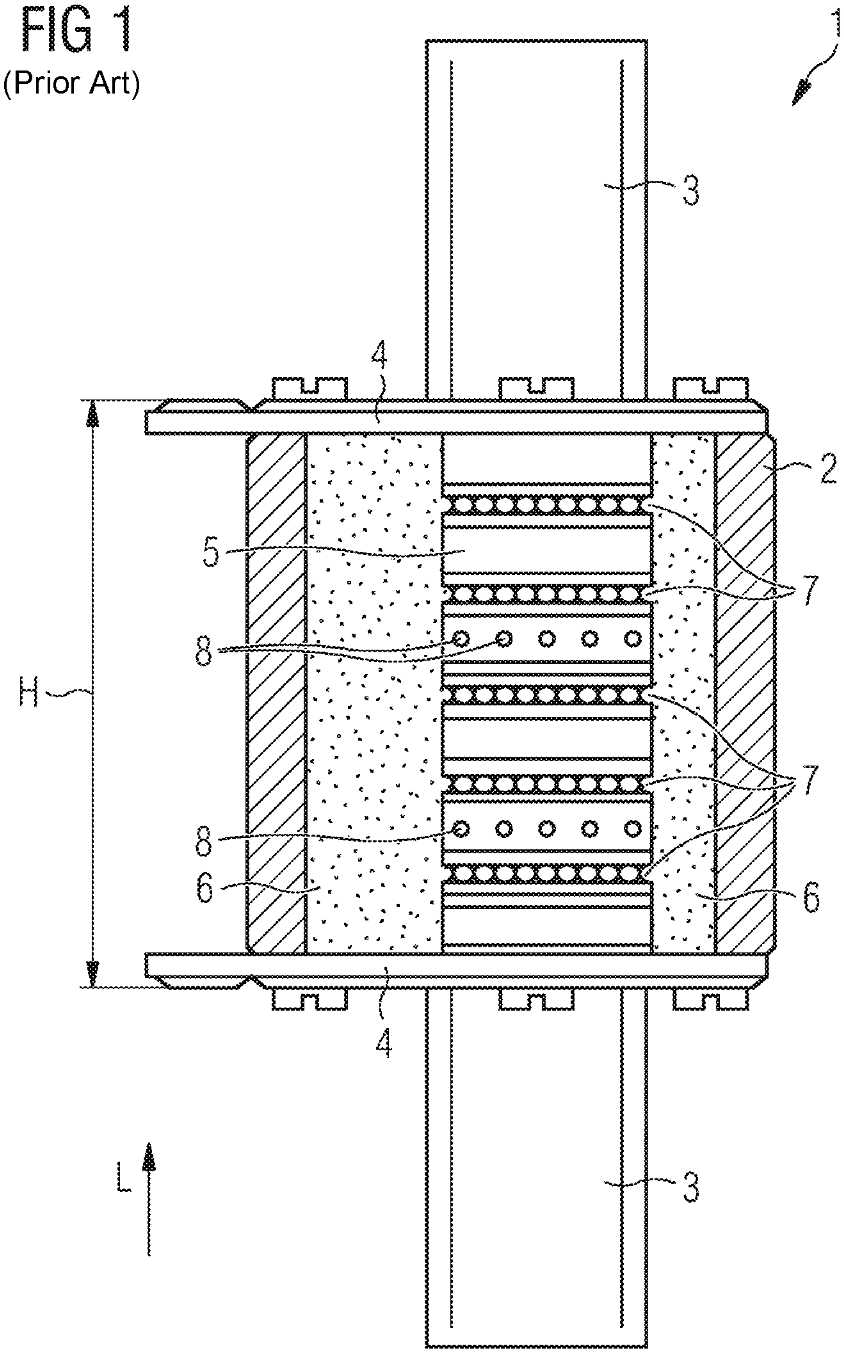
FIG 1 (Prior Art)
FIG. 1 is a schematic illustration of an NH fuse known from the prior art.

The fuse body according to an embodiment of the invention for a fuse with an integrated measurement function has a first reception space for receiving a fuse element of the fuse, wherein the first reception space is limited in a direction of longitudinal extent of the fuse by way of a closure element and in a direction orthogonal to the direction of longitudinal extent by way of the fuse body. The fuse body furthermore has a second reception space physically delimited from the first reception space for receiving a measurement device of the fuse, wherein the second reception space is designed to receive the measurement device in a wall section of the fuse body.

A fuse body, which can also be referred to as a pressure housing or pressure body, primarily serves to receive the pressure occurring when the fuse is heated or tripped, for which reason high requirements are placed on the mechanical strength and stability of the fuse body. The fuse body according to an embodiment of the invention for a fuse with an integrated measurement function furthermore serves to receive a measurement device of the fuse and to protect against damage. For this purpose, the fuse body has, in addition to the first reception space for receiving a fuse element, a second reception space for receiving the measurement device, which advantageously can be closed in the direction of longitudinal extent, for example by way of the closure element. In this way, the measurement device that can be arranged in the second reception space is effectively protected from interfering environmental influences such as dust, moisture or dirt.

By way of the fuse body according to an embodiment of the invention, it is possible to realize a fuse in which the electric current flowing through the fuse can be detected directly at the fuse without the installation shape or the installation size—and hence the technical properties of the fuse—being significantly influenced in the process. A fuse with the external dimensions of a conventional NH fuse can thus be realized and can also be used for retrofit applications.

In one advantageous development of the fuse body, the second reception space is limited both inwardly toward the first reception space and outwardly by in each case one wall section of the fuse body.

The second reception space is physically delimited by the fuse body in a direction oriented orthogonally to the direction of longitudinal extent both outwardly and inwardly, that is to say toward the first reception space. It is therefore possible to realize not only effective protection against the aforementioned environmental influences but also effective protection against damage to the measurement device due to an increase in pressure inside the fuse body caused by the fuse tripping. The reliability of the measurement device is significantly improved as a result.

In a further advantageous development, the fuse body has a substantially hollow-cylindrical shape, which can be closed at the ends using a respective closure element.

A hollow-cylindrical shape, which can also be referred to as a prism-like shape, constitutes a spatial form that is formed from a base and a height oriented orthogonally thereto. Such spatial forms have the advantage that they can be produced in a simple manner in an extrusion method given a suitable material selection. However, other manufacturing methods, in particular also additive manufacturing methods, also colloquially referred to as 3D printing, are also considered.

In a further advantageous development of the fuse body, the second reception space has an annular first section for receiving a transformer and a second section for receiving an electronics assembly.

The second reception space, which serves to receive the measurement device and constitutes a cavity formed in a wall section of the fuse body, can be divided into two partitions: an annular first section for receiving the transformer of the measurement device and a second section for receiving the electronics assembly of the measurement device. In this case, the two sections do not necessarily have to be separated from one another by way of a partition or similar but can be arranged directly adjacent to one another or else merge into one another.

In a further advantageous development of the fuse body, the first section and/or the second section can be closed by way of at least one of the closure elements.

With the aid of at least one closure element, both the first section and the second section can advantageously be closed in order to effectively protect the components of the measurement device that are arranged in the sections from environmental influences such as dust, dirt or moisture. The assembly outlay can be reduced in this way.

In a further advantageous development, the fuse body is designed in one part.

The one-part embodiment—in particular in view of the production of the fuse body with the aid of an additive manufacturing method—has the advantage that subsequent assembly steps are thus avoided. The assembly costs can be further reduced as a result.

In a further advantageous development, the fuse body is formed from a ceramic material or a thermostable plastic.

Ceramic materials are particularly suitable for manufacturing a fuse body due to their high pressure resistance. Thermostable plastics, provided that they are sufficiently thermally stable, are distinguished by contrast by their simplified processability with at the same time comparatively low manufacturing costs.

The fuse according to an embodiment of the invention having an integrated measurement function has a fuse body of the type described above, by way of which a first reception space and a second reception space physically delimited from the first reception space are formed. The fuse furthermore has a fuse element, which is arranged in the first reception space, and a measurement device, which is arranged in the second reception space. In this case, the second reception space is formed in a wall section of the fuse body, wherein the installation height required for the first reception space corresponds in the direction of longitudinal extent of the fuse to the installation height of a standardized NH fuse.

Using the measurement device provides the option of determining the electric current flowing through the fuse directly at the fuse. The second reception space is delimited by the fuse body in a direction radial to the direction of longitudinal extent both outwardly and inwardly, that is to say toward the first reception space, and therefore protected. In this way, it is possible to realize a fuse with an integrated measurement function in order to be able to detect the state of the fuse, and hence the state of an electrical system secured by means of the fuse, directly on site without requiring a visual check.

In an advantageous development of the fuse, the measurement device has a transformer and an electronics assembly. In this case, the transformer is arranged in a first section of the second reception space while the electronics assembly is arranged in a second section of the second reception space.

The transformer arranged in the second reception space serves here on the one hand as a current sensor, which forwards the detected current measurement values to the electronics assembly, where the measurement values are processed further. On the other hand, the energy required for this is likewise generated with the aid of the transformer by electromagnetic induction from the primary current, that is to say the operating current of the fuse. The transformer therefore also serves as energy source for the electronics assembly. In order to provide sufficient energy for the electronics assembly even in the case of low operating currents of the fuse and therefore to ensure the reliability of the measurement device, the transformer must be dimensioned to be relatively large for this purpose.

At the same time, the fuse must be kept compact in order to also be able to be used for retrofit applications in the context of retrofitting or modernization of existing systems, in which a conventional fuse without a measurement device is replaced. Since the fuse ideally in this case has the dimensions of a standardized NH fuse, the second reception space in which the measurement device is received and held, in particular in the axial direction, that is to say in the direction of longitudinal extent, is greatly limited. In order to be able to arrange the largest possible transformer in a first section of the second reception space, the electronics assembly is arranged laterally, that is to say in the radial direction, next to the transformer, in a second section of the second reception space. In this way, the transformer can be optimized in terms of its dimensions so that the energy provided for the electronics assembly is as great as possible. In this way, it is possible to construct a fuse with an integrated measurement function that does not require an external current source for supplying energy to the measurement device.

In a further advantageous development of the fuse, the electronics assembly has a transmission device in order to transmit a measurement signal detected by the measurement device to a reception device arranged outside of the fuse.

The determined measurement data or else data processed further based on the measurement data can be transmitted to an external unit, for example a data collection device or a control room, with the aid of the transmission device. In this way, it is possible to be able to determine the operating state of the fuse at any time without a technician or an installer who inspects the fuse on site being required for this.

In a further advantageous development of the fuse, the measurement signal is transmitted wirelessly by the transmission device to the reception device.

Wireless transmission of the data to the external reception device significantly simplifies the installation expenditure of the fuse. For the wireless transmission of the data—measurement values or preprocessed data based on measurement values—by the transmission device to the reception device, common transmission methods such as Bluetooth, RFID (both active and passive), Zigbee, etc. come into consideration, for example. The energy required for the transmission is advantageously obtained here again with the aid of the transformer by electromagnetic induction from the primary current.

In a further advantageous development of the fuse, the overall installation space required for the fuse corresponds to the installation space of a standardized NH fuse.

By virtue of the fuse having an integrated measurement function according to an embodiment of the invention corresponding in terms of its installation size to the size of a conventional NH fuse, the fuse is also able to be used for retrofit applications in the context of retrofitting or modernization of existing systems in the context of which a conventional fuse without a measurement device is replaced with a fuse with an integrated measurement function.

FIG. 1 schematically shows the basic structure of a standardized NH fuse, as is already previously known from the prior art. The fuse 1 has two connection elements 3, which include an electrically conductive material, for example copper. In the illustrations, the connection elements 3 are designed as blade contacts—this is, however, not essential to the invention. The connection elements 3 are fixedly and tightly mechanically connected to a protective housing 2 with the height H that includes a solid, non-conductive and as far as possible heat-resistant material, for example of a ceramic, and serves as pressure body for the fuse 1. The protective housing 2 generally has a tubular or hollow-cylindrical basic shape and is externally closed in a pressure-tight manner, for example using two closure caps 4. The connection elements 3 in this case each extend through an aperture formed in the closure caps 4 into the cavity of the protective housing 2. In this cavity there is arranged at least one so-called fuse element 5 that electrically conductively connects the two connection elements 3 to one another.

The rest of the cavity is for the most part completely filled with an extinguishing material in an extinguishing area 6, that serves to extinguish and cool the fuse 1 when it is tripped and completely surrounds the fuse element 5. Quartz sand is used as a material in the extinguishing area 6, for example. Instead of the one fuse element 5 illustrated in FIG. 1, it is likewise possible to arrange a plurality of fuse elements 5 electrically connected in parallel to one another in the protective housing 2, and correspondingly to make contact with the two contact elements 3. The trip characteristic curve—and therefore the trip behavior—of the fuse 1 is able to be influenced by the type, number, arrangement and layout of the fuse elements 3.

The fuse element 5 generally includes a material with good conductivity, such as copper or silver, and has a plurality of rows of narrow points 7 and one or more solder deposits 8—what are known as solder points—over its length, that is to say in its direction of longitudinal extent L. The direction of longitudinal extent L is therefore the parallel to an imaginary connecting line of the two connection elements 3. The trip characteristic curve of the fuse 1 is likewise able to be influenced and adapted to the respective case of application by the rows of narrow points 7 and the solder points 8.

In the case of currents that are smaller than the nominal current of the fuse 1, only so much power loss is converted in the fuse element 5 that the power loss is quickly able to be output externally in the form of heat by way of the extinguishing material 6 including sand, the protective housing and the two connection elements 3. The temperature of the fuse element 5 in this case does not increase beyond its melting point. If a current that lies in the overload region of the fuse 1 flows, then the temperature inside the fuse 1 continuously further increases until the melting point of the fuse element 5 is exceeded and this melts through at one of the rows of narrow points 7. In the case of high fault currents—as occur for example due to a short circuit—so much power is converted in the fuse element 5 that this is heated practically over the entire length and consequently melts at all of the rows of narrow points 7 at the same time.

Since liquid copper or silver still has good electrically conductive properties, the flow of current is not yet interrupted at this time. The melt formed from the fuse element 5 is therefore heated further until it finally transitions into the gaseous state, as a result of which a plasma forms. A light arc in this case occurs so as to further maintain the current flow through the plasma. In the last stage of a fuse disconnection, the conductive gases react with the material in the extinguishing area 6, which for the most part includes quartz sand in the case of conventional fuses 1. This is melted due to the extremely high temperatures, brought about due to the light arc, in the environment of the light arc, which leads to a physical reaction of the molten fuse element material with the surrounding quartz sand of the material in the extinguishing area 6. Since the reaction product occurring in this case is not electrically conductive, the current flow between the two connection elements 3 quickly drops to zero. In this case, however, it should be borne in mind that a corresponding mass of extinguishing part also requires a specific mass of fuse element material. Only in this way is it able to be ensured that there is still enough material in the extinguishing area 6 present at the end of the fuse disconnection to effectively bind all of the conductive plasma.

Figure 2:
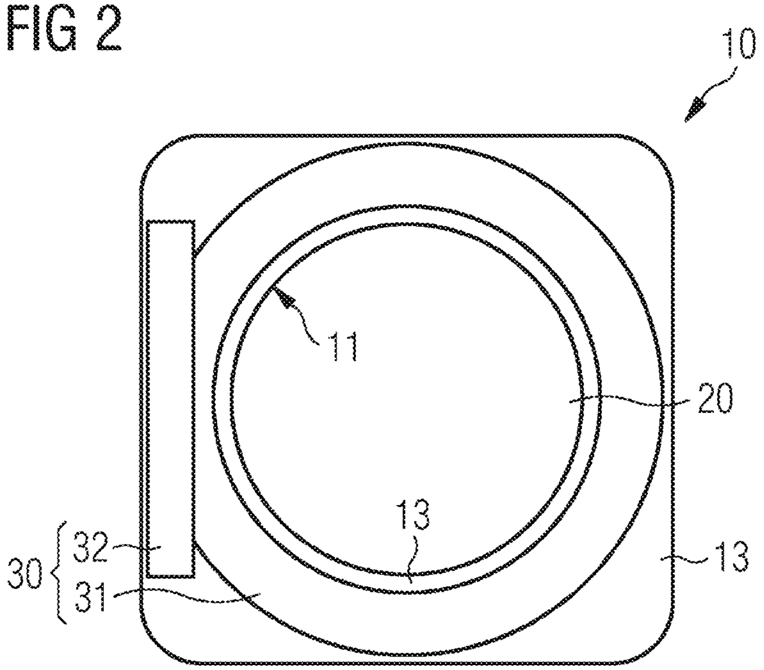
FIGS. 2 to 4 are schematic illustrations of the fuse body according to embodiments of the invention for a fuse with an integrated measurement function in various views.
Figure 3:
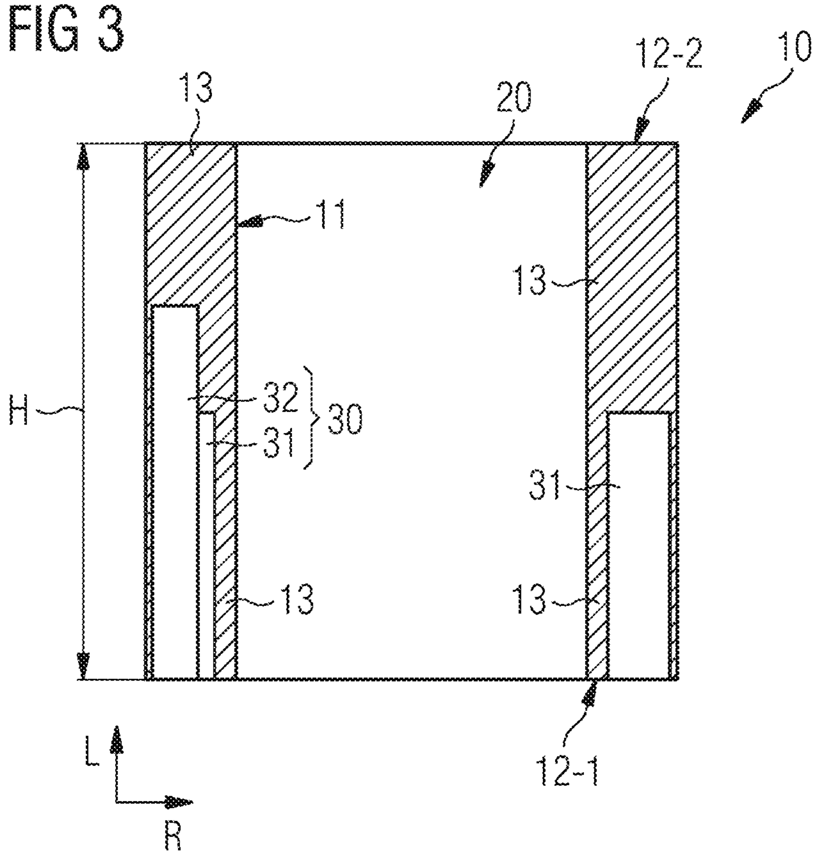
Figure 4:
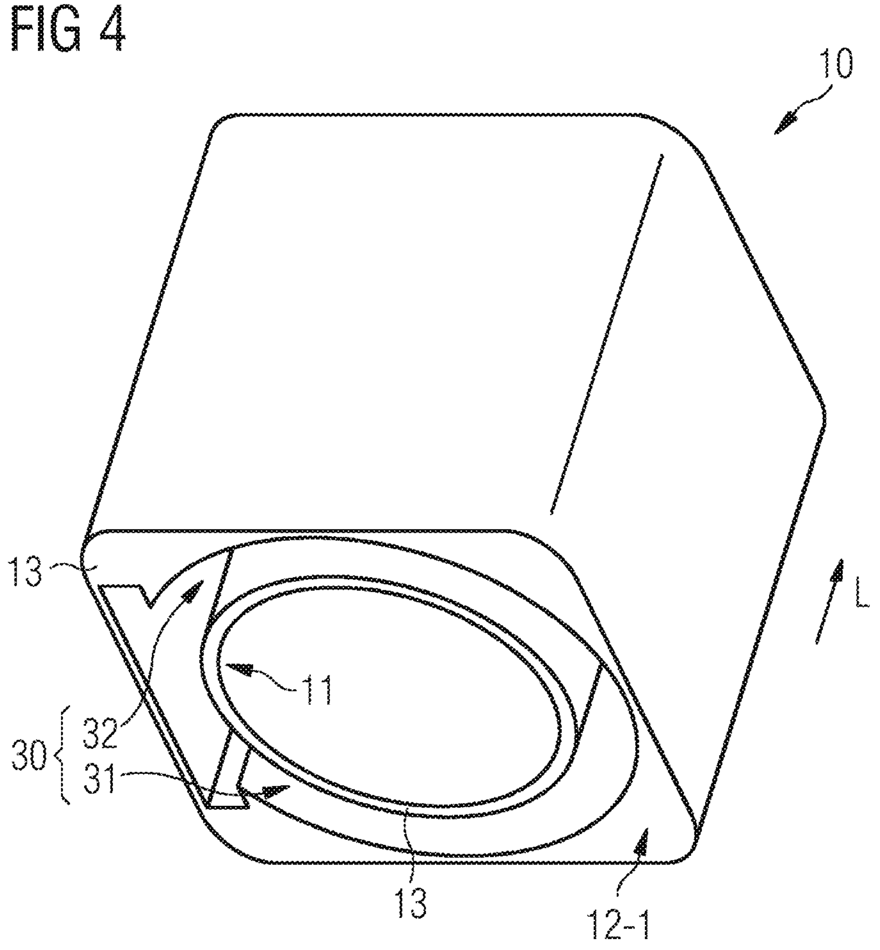

FIGS. 2 to 4 schematically illustrate an example embodiment of the fuse body 10 according to an embodiment of the invention for a fuse with an integrated measurement function. The fuse body 10 is formed in one part from a suitable material, for example a ceramic or a thermostable plastic. It is formed as a hollow body whose substantially cylindrical inner wall 11 limits a first reception space 20, which extends along a direction of longitudinal extent L, in a radial direction R oriented orthogonally to the direction of longitudinal extent L. The fuse body 10 is limited in the direction of longitudinal extent L and in the opposite direction by in each case an end side 12-1 and 12-2, respectively, on which end sides in each case one closure element (not illustrated) of the fuse can be mounted in order to close the first reception space 10 in the direction of longitudinal extent L and in the opposite direction. The installation height H of the fuse 10 corresponds here to the installation height of a standardized NH fuse, as illustrated in FIG. 1 and described above.

The first reception space 10 serves to receive and to secure a fuse element (not illustrated) of the fuse. The first reception space 10 can furthermore be filled with a suitable extinguishing means, for example quartz sand, in order to improve the tripping properties of the fuse. The first reception space 10 therefore corresponds to the cavity of the fuse described above in relation to FIG. 1.

The fuse body 10 according to the invention furthermore has a second reception space 30, which is formed in a wall 13 of the fuse body 10. The second reception space 30 is provided to receive a measurement device (not illustrated) of the fuse in order to measure the electric current flowing through the fuse, to process the measured signal, where appropriate, and to transmit same to a superordinate point, for example a data collector or a control room. In terms of design, the second reception space 30 constitutes a pocket-like depression, which is introduced into the first end side 12-1. The second reception space 30 is limited toward the other end side 12-2, as well as outwardly and inwardly toward the first reception space 31, by way of the fuse body 10.

The measurement device (not illustrated) that is to be arranged in the second reception space 30 substantially includes a transformer and an electronics assembly electrically conductively connected thereto. Therefore, the second reception space 30 is divided into an annularly formed first section 31, which serves to receive the annular transformer, and a second section 32, which is designed to receive the electronics assembly. The two sections 31 and 32 in this case do not have to be delimited from one another by way of a partition or similar, but instead can be arranged directly adjacent to one another or else merge into one another.

The transformer serves here primarily as a current sensor, which detects the electric current flowing through the fuse. The detected current measurements are then forwarded to the electronics assembly. Furthermore, the energy required for the electronics assembly can likewise be generated with the aid of the transformer by electromagnetic induction from the primary current, that is to say the operating current of the fuse. In addition to its measurement function, the transformer therefore also serves as energy source for the electronics assembly. As a result, it is possible to design a fuse with an integrated measurement function that does not require an external current source for supplying energy to the measurement device.

The electronics assembly must be designed as compactly as possible since the installation space available for this in the second section 32 of the second reception space 30 is greatly limited. A compact design is possible, for example, by using a compact printed circuit board with integrated circuits. In order to transmit the determined measurement data or else data processed further based on the measurement data to a reception device, for example a data collection device or a control room, arranged outside of the fuse, the electronic assembly has a suitable transmission device. For this transmission, all common transmission methods such as Bluetooth, RFID (both active and passive), Zigbee, etc. come into consideration, for example. In this way, it is possible to be able to determine the operating state of the fuse at any time without a technician or an installer who has to inspect the fuse on site being required for this.

The fuse body according to an embodiment of the invention for a fuse with an integrated measurement function and the associated fuse are characterized in that the measurement and communication technology is not arranged in a separate housing, but in a recess formed in the fuse body. This has the advantage that no additional installation space is required for the measurement device, which would lead to shortening of the fuse body, which would lead to a reduction in the nominal voltage of the fuse that is to be achieved.

LIST OF REFERENCE SIGNS

1 Fuse
2 Protective housing/pressure body
3 Connection element
4 Closure cap
5 Fuse element
6 Extinguishing area/extinguishing sand
7 Row of narrow points
8 Solder deposit
10 Fuse body
11 Inner wall
12-1 First end side
12-2 Second end side
13 Wall
20 First reception space
30 Second reception space
31 First section
32 Second section
H Installation height
L Direction of longitudinal extent
R Radial direction

The invention claimed is:

1. A fuse body for a fuse with an integrated measurement function, the fuse body comprising:

a first reception space configured to receive a fuse element of the fuse, the first reception space being limited in a direction of longitudinal extent of the fuse by way of at least one closure element and in a direction orthogonal to the direction of longitudinal extent by way of the fuse body of the fuse, the first reception space defined by an inner wall of the fuse body; and a second reception space physically delimited from the first reception space and configured to receive a measurement device of the fuse, the second reception space defined between the inner wall and an outer wall of the fuse body, and the second reception space including an annular first section configured to receive a transformer of the measurement device and a cuboid second section directly contacting the annular first section and configured to receive an electronics assembly of the measurement device, the outer wall of the fuse body defining the cuboid second section.

2. The fuse body of claim 1, wherein the fuse body has a substantially hollow-cylindrical shape, closable at ends of the fuse body using respective closure elements of the at least one closure element.

3. The fuse body of claim 2, wherein at least one of the first reception space and the second reception space are closable by at least one of the respective closure elements.

4. The fuse body of claim 1, wherein the fuse body is designed in one part.

5. The fuse body of claim 1, wherein the fuse body is formed from a ceramic material or a thermostable plastic.

6. A fuse with an integrated measurement function, the fuse comprising:

the fuse body of claim 1, including the first reception space and the second reception space physically delimited from the first reception space; and wherein an installation height required for the first reception space corresponds, in the direction of longitudinal extent, to an installation height of a standardized NH fuse.

7. The fuse of claim 6, wherein the electronics assembly includes a transmission device to transmit a measurement signal to a reception device arranged outside of the fuse.

8. The fuse of claim 7, wherein the transmission device is configured to transmit the measurement signal to the reception device wirelessly.

9. The fuse of claim 6, wherein an overall installation space required for the fuse corresponds to an installation space of a standardized NH fuse.

10. A fuse with an integrated measurement function, the fuse comprising:

the fuse body of claim 2, including the first reception space and the second reception space physically delimited from the first reception space;

wherein an installation height required for the first reception space corresponds, in the direction of longitudinal extent, to an installation height of a standardized NH fuse.

11. The fuse of claim 7, wherein an overall installation space required for the fuse corresponds to an installation space of a standardized NH fuse.

12. The fuse body of claim 1, wherein the cuboid second section of the second reception space has a rectangular shape.

* * * * *